No. 764,820. PATENTED JULY 12, 1904.
T. B. PRICE.
CHAMFERING MACHINE FOR MAKING MINE TIES.
APPLICATION FILED NOV. 27, 1903.
NO MODEL. 2 SHEETS—SHEET 1.
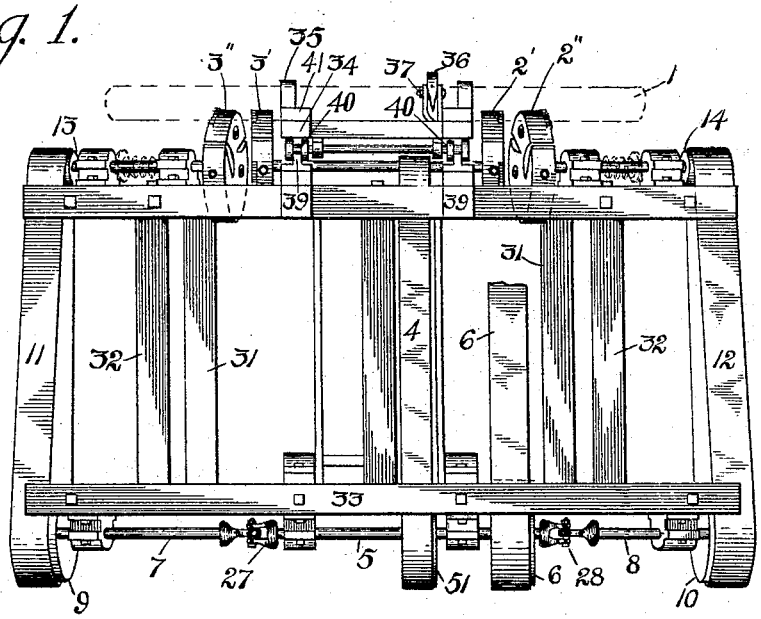

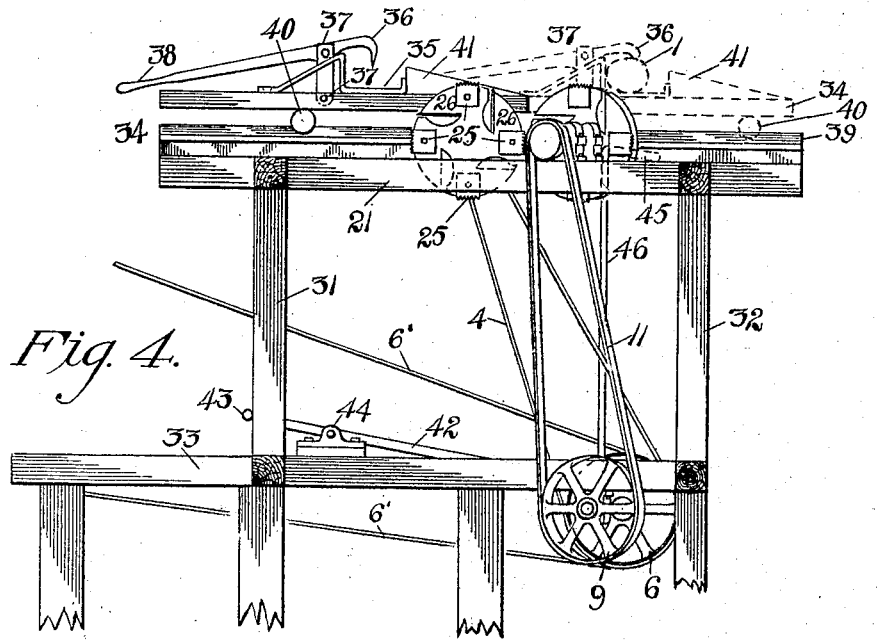

No. 764,820.

Patented July 12, 1904.

UNITED STATES PATENT OFFICE.

THEODORE B. PRICE, OF CRESCO, PENNSYLVANIA.

CHAMFERING-MACHINE FOR MAKING MINE-TIES.

SPECIFICATION forming part of Letters Patent No. 764,820, dated July 12, 1904.

Application filed November 27, 1903. Serial No. 182,733. (No model.)

*To all whom it may concern:*

Be it known that I, THEODORE B. PRICE, a citizen of the United States, residing at Cresco, in the county of Monroe and State of Pennsylvania, have invented certain new and useful Improvements in Chamfering-Machines for Making Mine-Ties, of which the following is a specification.

This invention relates to chamfering-machines; and the objects of the invention are to provide a machine for chamfering the notches in mine-ties, to produce two converging and two parallel sides to a pair of chamfers at one operation, to simplify the construction of such machines, and other objects, as are herein specified, and illustrated in the drawings, in which—

Figure 1 is a front elevation of one of my chamfering-machines ready for use. Fig. 2 is a top plan view of the same machine. Fig. 3 illustrates a mine-tie and the plan of the chamfers to be made. Fig. 4 is a side elevation of the machine. Fig. 5 is an enlarged view of the cutter-heads and other attachments on one side of my machine.

Similar characters of reference denote like and corresponding parts throughout the several views.

Referring to the drawings, 1 designates a mine-tie having chamfers 2 and 3 cut out by my machine, the chamfer 2 being produced by the cutter-heads 2' and 2'' and the chamfer 3 being produced by the cutter-heads 3' and 3''. Cutter-heads 2' and 3' are secured to a revolving shaft 4, driven by a belt 4' from the shaft 5, the shaft 5, having a pulley 6, driven by the main belt 6', through which power is applied to the machine. The shaft 5 has connected with it shafts 7 and 8, carrying, respectively, pulleys 9 and 10, driving, respectively, belts 11 and 12, running on pulleys 13 and 14, respectively, which pulleys are arranged to drive the cutter-head shafts 15 and 16, which are set at an angle, so as to cut the outer sloping sides of the chamfers 2 and 3, respectively. The shafts 15 and 16 are journaled at 17 19 and 18 and 20 to the timbers 21 23 and 22 24, the said shafts being arranged at right angles with their respective timbers; but each pair of said timbers are set in an oblique position, so as to hold the cutter-heads aforesaid in position for cutting the oblique sides of the chamfers. Saw-toothed sections 25 25 are set into the outer edges of the cutter-heads, so as to cut square shoulders to the notches or chamfers, while the shaving-knives 26 are set with their edges lying in line with the convex surface of the cutter-head bodies. The lower pulleys 9 and 10 are brought into rangement with the upper pulleys 13 and 14 by means of universal joints 27 and 28, which connect the shafts 7 and 8 to the main shaft 5. The shafts 15 and 16 are slidable lengthwise in their bearings, and the pulleys 13 and 14 are consequently made longer than the widths of the belt which run them. The shafts are normally held to the outer ends of their courses by means of coiled springs 29 29, impinging against collars 30 30, arranged on the respective shafts, the opposite ends of said springs 29 resting against the journaled bearings of the respective shafts. The top portions of the machine are supported by uprights 31 and 32, extending from the upper timbers to the base timbers 33.

The carriage 34, arranged to hold the ties to be operated upon, provided with rests 35 35, operates on a slideway or track 39 39. The tie to be operated upon is held in position by means of a dog 36, pivotally attached at 37 37', operable by the handle 38. The carriage 34 is supported by rollers 40 40, disposed between the track 39 and the bottom of the carriage 34. Bridges or chutes 41 41 are arranged in proximity to the rests 35 35 and are designed to slide the finished tie off the machine. The tie is lifted off the rests 35 35 by means of a lever 42, having a foot-rest 43 and being pivoted at 44, the said lever carrying an upright 46, having a foot 45, arranged to lift the tie out of the rest 35 and throw it onto the bridges 41 41 when the treadle foot-rest 43 is kicked downward by the operator.

The operation of the machine is apparent. The tie to be operated upon is laid into the rest 35 and held securely by means of the dog 36, the operator with one hand lifting upward on the handle 38 and with the other pushing forward on the carriage 34, thus bringing the tie over the operating knives and saws of the cutter-heads. As the tie advances the outer sloping edge, which is started by the saws 25 of the oblique cutter-head, serves to draw inward on the oblique cutter-heads, compressing the springs 30 30 until the oblique cutter-head is forced into the position shown in dotted lines in Fig. 5, in which position it clears the narrowest parts of the notch which it is cutting. Having been pushed beyond both cutter-heads, the operator now presses his foot on the rest 43, which operation throws upward the feet 45 45 of the throw-off apparatus. At the time of this operation the operator releases the dog 36 by pressing upward on the handle 38, and the tie thus released is pushed upward and rolled onto the bridges 41 41, whence by its own weight it drops off the foot of the machine, and the operating-carriage is ready for another tie.

Having thus described my invention, what I claim as new, and desire to secure by Letters Patent, is—

1. In a chamfering-machine, a pair of cutter-heads arranged to cut parallel grooves, and an additional pair of cutter-heads arranged in oblique positions with the said first pair of cutter-heads, the second pair of cutter-heads being arranged on sliding shafts, springs arranged on said shafts to hold them to the outer part of their courses, and the additional cutter-heads arranged to be drawn inwardly in the operation of the machine, substantially as specified.

2. In a chamfering-machine of the kind described, a pair of cutter-heads arranged to cut parallel grooves, the said cutter-heads mounted on a common revolving shaft, a pair of additional cutter-heads arranged in oblique positions, in proximity to said first cutter-heads, and each of said additional cutter-heads on a separately-revolving shaft, and the shafts of the said additional cutter-heads being provided with a spring encircling each shaft and arranged to allow an endwise-sliding motion of said cutter-head shaft, substantially as specified.

In testimony whereof I affix my signature in presence of two witnesses.

THEODORE B. PRICE.

Witnesses:
S. C. VESEY,
D. B. REPLOGLE.